Feb. 20, 1962
C. E. HEATH, JR     3,022,237
RADIATION METHYLATION OF UNSATURATED HYDROCARBONS
Filed April 30, 1958
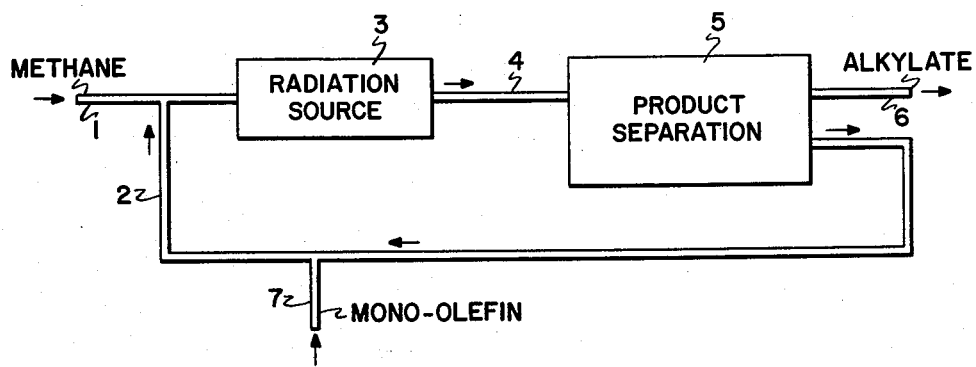
Carl E. Heath, Jr.    Inventor
By L. A. Strimbeck
Attorney

3,022,237
RADIATION METHYLATION OF UNSATURATED HYDROCARBONS

Carl E. Heath, Jr., Nixon, N.J., assignor to Esso Research and Engineering Company, a corporation of Delaware
Filed Apr. 30, 1958, Ser. No. 731,931
8 Claims. (Cl. 204—162)

This invention relates to the radiation conversion of hydrocarbons and more particularly to the methylation of unsaturated hydrocarbons by the reaction of methane with mono-olefins in the presence of high energy ionizing radiation. The process is extremely valuable for upgrading light refinery ends to higher boiling isoparaffins.

Generally, the conversion of paraffin-olefin mixtures has been carried out in the presence of various alkylation catalysts, promoters and activators, and complicated separation and recovery processes have been required to obtain the desired alkylate product. Heretofore, however, it has not been possible to successfully alkylate olefins with methane due to the extreme stability of the latter hydrocarbon.

The present invention provides a novel hydrocarbon conversion process which obviates this and other disadvantages of prior art methods for reacting paraffins with olefins. In brief, this invention provides a process for upgrading refinery gases to high octane gasoline components by reacting methane with olefins by subjecting a mixture of these hydrocarbons to high energy ionizing radiation. Specifically the preferred process of the present invention comprises irradiating methane with high energy ionizing radiation, in the presence of a small amount of a mono-olefinic hydrocarbon having in the range of 2 to 7 carbon atoms, until in the range of $10^{-6}$ to $10^3$ kwh. of radiation energy per pound of hydrocarbon feed has been absorbed, and recovering a higher molecular weight saturated homologue of the mono-olefin with a yield above 1000 molecules reacted per 100 electron volts absorbed.

In the preferred process, conversion is carried out at a temperature in the range of 650° to 900° F. at a pressure in the range of 10 to 55 atmospheres with a total radiation dose in the range of $10^{-4}$ and 10 kwh. per pound of hydrocarbon feed.

Broadly, any mono-olefin can be reacted with methane according to the present invention. Particularly the process is applicable for the conversion of olefinic hydrocarbons having from 2 to 12 carbon atoms. Most interesting are the mono-olefins having from 2 to 7 carbon atoms and mixtures of these. Cyclic olefins can also be employed. Most advantageously olefins which are normally gaseous are utilized.

Various refinery gases are also contemplated as feed stocks for the present invention. It is only essential that the feed stocks to the process contain methane and also contain an initial concentration of a mono-olefin. By the irradiation of the paraffin alone one cannot achieve the novel results of this invention.

Particularly advantageous for the present process is a refinery hydrocarbon feed boiling at a temperature in the range of from −258° to 200° F. containing at least 95 weight percent of a methane-mono-olefin mixture wherein the methane/olefin molar ratio is in the range of 9:1 to 200:1. Furthermore, the presence of hydrogen is not deleterious to the reaction. Therefore, an unpurified refinery gas stream is suitable for use in the reaction.

As has already been stated it is necessary to employ a substantial molar excess of the methane component of the feed stock. Further, according to this invention, the mole ratio of methane to olefin cannot be less than 9:1. Higher concentrations of olefin result in polymerization reactions detrimental to the alkylation reaction. Most preferably, methane/olefin mole ratios in the range of 9:1 to 200:1 are utilized and the radiolysis of the feed mixture is carried out by exposing it either continuously or batchwise to the radiation. The unconverted constituents can be then returned to the reaction zone in an ordinary recycle process. Most advantageously the process of this invention is carried out in the vapor phase.

Methylation is made to take place by exposing methane in contact with small amounts of a mono-olefin or a mono-olefinic mixture to high energy ionizing radiation, that is high energy quanta (radiation wave length less than 50 A.), neutrons, and charged and uncharged particles of atomic and sub-atomic nature having energies greater than about 30 electron volts. Types of radiation suitable for the purposes of invention include high energy electro-magnetic radiation such as gamma rays, X-rays and high velocity electrons as well as beta rays, alpha particles, protons, deuterons, fission fragments and neutrons. These types of radiation can be supplied by radioactive materials, nuclear machines or by common neutron sources. Fission by-products of processes generating atomic power or fissionable materials which emit high energy gamma rays also afford a highly desirable and most abundant source of radioactivity suitable for the purposes of the invention.

In one embodiment of the invention, the irradiation with gamma rays and neutrons can be carried out most conveniently, particularly on a commercial scale, by employing a conventional atomic pile, that is, a nuclear reactor. A batch reaction can be carried out simply by irradiating the material in a container. In carrying out a continuous process the material to be irradiated can be pumped through pipes disposed in the atomic pile. Generally, the radiation from an atomic pile will consist primarily of neutrons and gamma rays. The neutron flux existing in these atomic piles generally will be in the range of about $10^{11}$ to $10^{14}$, usually about $10^{12}$ to $10^{13}$ neutrons per centimeter squared per second and the gamma ray dosage will generally be from about $10^4$ to $10^8$, usually about $10^6$ to about $10^7$ roentgens per hour. Conventional moderators can of course be used, such as water, carbon, and hydrocarbons. Radiation fields in the range of $10^5$ to $10^9$ r./hr. are employed.

Materials made radioactive by exposure to neutron irradiation such as radioactive cobalt-60 which emits gamma rays can likewise be used with radiation fields in the range of 0.1 to $10^6$ r./hr.

Suitable sources of high velocity electrons are the beams of electron accelerators such as the Van de Graaff electrostatic accelerator, resonant transformers and linear accelerators. For example, radiation intensities of the order of $4 \times 10^6$ r./sec. are obtained with electron beams. Electrons having energies in the range of 0.5 to 10 mev. can be employed.

Most preferably, however, high velocity electrons, high energy gamma rays, and neutrons are preferred for the purposes of this invention mainly because of the high penetrating power of the rays and the availability and ease of application of these sources of high energy ionizing radiation. By high energy ionizing radiation is meant the ionizing radiation from controlled terrestrial sources of energy equivalent to at least 30 electron volts and a dose rate of at least $1 \times 10^{-4}$ kwh. per pound of hydrocarbon reactant per hour. This excludes radiations such as cosmic and ultra-violet, which are ineffectual for the purposes of this invention.

The methylation of mono-olefinic hydrocarbons to produce an alkylate product in a high yield can be, according to the present invention, carried out utilizing a wide radiation dose range. Preferably dosages are from about $10^{-6}$ to about $10^3$ kwh. per pound of reactant (1 roentgen equals $1.06 \times 10^{-9}$ kwh./lb.). A total energy absorption of from about $10^{-4}$ to about 10 kwh. per pound of reactant produces as a conversion product a higher molecular weight saturated homologue of the mono-olefin with a product selectivity in the range of about from 2 to 30 weight percent based upon the total weight of methane and olefin present.

According to the present invention small amounts of a mono-olefin can be added to methane and the resultant mixture subjected to high energy ionizing radiation of an intensity and for a duration sufficient to convert a substantial proportion of the mixture to a conversion product. This product containing substantial amounts of higher molecular weight saturated homologues of the olefin employed can be separated from the reaction medium and fractionated within the desired boiling range. The unreacted methane can be then returned to the reactor to be further converted to more useful products. Advantageously mixtures of methane and olefin are fed into an atomic reactor in a continuous feed system. Radiation dose rate is determined by geometrical considerations and, therefore, total energy absorption is determined by feed rate. Contact times can vary from a fraction of a minute per pass up to an hour or more. In batch reactions contact time can be from about one-half hour to about 200 hours. In general it is desirable to convert only a portion of the methane-olefin feed in a single pass through the radiation zone in the continuous system. The product can be recovered outside the reaction zone and the unreacted paraffin returned to the radiation reactor in an ordinary recycle process. In this way the probability that alkylate product will be cracked by continuing the radiation reaction after the product is formed, is reduced. Advantageously only about 1 to about 50 percent of the reactant is converted in the radiation process and unreacted reactant is returned for further processing following the separation of the desired product. The reaction can also be carried out in the presence of a chain transfer agent, i.e. a sensitizer, such as a chloro-hydrocarbon such as tetrachlorethane or chloroform, or an oxygen-containing compound such as an ether or a ketone. The amount of the sensitizer is not critical and can be from ½ to 25 mole percent.

No special type of apparatus is required for carrying out the novel conversion process of this invention. The usual alkylation equipment in connection with conventional radiation sources has been found to be entirely satisfactory. However, since the novel process avoids the use of the corrosive catalyst of the prior art it is unnecessary in order to preserve the equipment to construct the apparatus coming in contact with the reactants of the alkylation process out of acid resistant metals.

The novel features which are believed to be characteristic of the invention, both as to its organization and method of operation, will be understood more clearly and fully from the following description considered in connection with the accompanying drawing.

Referring to the drawing in detail, it will be seen that the methane to be converted is admitted to the process by line 1. Mono-olefin is supplied to line 2 by line 7.

The mono-olefin component added to the paraffinic feed can be controlled in order to obtain high yields of conversion product. The amount to be added is determined in any convenient manner as by observing the composition, distribution or yield of the products or by monitoring the admixture entering the radiation reaction zone. This can be done by continuous analysis, for example, by continuously measuring the product quality or continuously measuring by spectroscopic techniques the olefin composition of the feed mixture.

The resultant mixture is then exposed to high energy ionizing radiation in radiation zone 3. For example, this source can comprise a conventional atomic pile, and the mixture can simply be passed through the pile in suitable conduits. It can flow around or through the core of the reactor and in some cases the hydrocarbon mixture can serve as a moderator. Suitable conditions of pressure and temperature are maintained during the alkylation.

Another suitable source of radiation comprises atomic "waste products" or Cobalt-60 obtained from nuclear reactors or atomic piles. This material can be suitably enclosed or concentrated as in an underground storage area and the hydrocarbon mixture can be passed through or around the source.

Electron accelerators of the linear type and the Van de Graaff generators can also be employed as a source of high energy electrons. The electrons are directed through a thin, suitably reinforced window into the hydrocarbon mixture.

The converted material is removed by line 4 and passed into a suitable product separation zone 5. This zone can comprise, for example, a distillation zone, several flash vaporization chambers, a solvent extraction zone, and an absorption zone or a combination of any of these.

The desired alkylate products are removed from zone 5 by line 6 and preferably but not necessarily the unreacted methane and olefin are recovered and removed by line 2 for recycle to the feed stream as indicated.

To further illustrate the invention the following examples are presented:

EXAMPLE 1

The major result from pile irradation of methane-ethylene in vapor phase is the production of propane with good selectivity and high radiation yields. The neutron irradiations were carried out in the atomic pile at Brookhaven National Laboratory utilizing a radiation dosage of approximately $1.06 \times 10^{-2}$ kwh. per pound of reactant per hour. The reactor has been fully described in Brookhaven National Laboratory, Research Reactor Facility, Irradiation Services and Radioisotopes, published by Associated Universities, Inc., December 1955. Methane-olefin (mole ratio 13.3:1).

(1) Operating conditions:
Once-through flow equipment.

| | |
|---|---:|
| Temperature, °F. | 900 |
| Pressure, p.s.i.g. | 550 |
| Contact time, minutes | 20.3 |
| Radiation energy absorbed, ev./gm. | $3 \times 10^{20}$ |
| Material balance, weight percent | 98.6 |
| Reactor volume, cc | 670 |

(2) Feed composition, wt. percent on feed:

| | |
|---|---:|
| Ethylene | 11.5 |
| Methane | 88.5 |
| | 100.0 |

Product yields, wt. percent on feed:

| | |
|---|---:|
| Propane | 3.7 |
| Ethane | 1.5 |
| Propylene | 1.2 |
| Isobutane | 4.8 |
| Butene | Trace |
| Polymer | 0.5 |
| | 11.7 |

(3) Reaction selectivity, wt. percent on feed reacted:

| | |
|---|---:|
| Ethane | 11.4 |
| Propane | 32.6 |
| Butenes | 0.3 |
| Propylene | 10.1 |
| Isobutane | 41.1 |
| Isopentane | 4.5 |
| | 100.0 |

(4) Feed consumption, wt. percent on feed component:
Ethylene _____ 69.5
Methane _____ 4.4
(5) Radiation yields, molecules made/100 ev.:
Alkylate _____ 750

The composition of the alkylate product (containing 3 or more carbon atoms) is given in Table 1:

*Table I*

Composition of product (wt. percent):
Paraffins—
Propane _____ 36.3
Isobutane _____ 47.1
Isopentane _____ 5.1
Olefins—
Propylene _____ 11.0
Butene _____ 0.4

The above example shows that radiolysis of methane-ethylene mixtures in the vapor phase results in the production of alkylate with high selectivity and high radiation yields. The data clearly indicates that higher molecular weight saturated homologues of mono-olefins can be produced from methane by the addition of small amounts of mono-olefin and the radiolysis of the mixture at low pressures. The high selectivity to isobutane was quite unsuspected.

EXAMPLE 2

The methane-ethylene reaction in accordance with the present invention was further studied under a variety of conditions. Feed rates were varied from 3 to 20 v./hr./v. and contact times from 3 to 20 minutes were employed. Typical results are given below for irradiation processes carried out in the manner described in Example 1.

*Table II*
BROOKHAVEN FLOW SYSTEM

| Temp., °F | 700 | 900 | 800 |
|---|---|---|---|
| Pres., p.s.i.g. | 550 | 150 | 550 |
| Contact Time, Minutes | 13.7 | 3.0 | 13.7 |
| Radiation Energy Absorbed, ev./gm. | 2.0×10²⁰ | 3×10¹⁹ | 2.0×10²⁰ |
| Mat. Bal., Percent | 78.3 | 76.3 | 67.5 |
| Feed Comp., Wt. Percent on Feed: | | | |
| Ethylene | 8.1 | 9.0 | 15.3 |
| Methane | 90.1 | 87.0 | 81.3 |
| Product Yields, Wt. Percent on Feed: | | | |
| Propane | 4.2 | 1.9 | 5.0 |
| Ethane | 0.0 | 1.3 | .5 |
| Isobutane | 0.8 | .4 | .4 |
| Isopentane | 0.6 | .2 | .5 |
| Propylene | 0.6 | 0.0 | 1.3 |
| Butene | 0.6 | 0.0 | 1.2 |
| Pentene | Trace | 0.0 | 0.0 |
| Polymer | 0.0 | 0.0 | .3 |
| | 6.8 | 3.8 | 9.2 |
| Reaction Selectivity, Wt. Percent on Feed Reacted: | | | |
| Ethane | 0.0 | 34.2 | 4.9 |
| Propane | 61.6 | 50.0 | 54.5 |
| Butenes | 8.6 | 0.0 | 13.4 |
| Propylene | 8.6 | 0.0 | 12.9 |
| Isobutane | 11.4 | 10.6 | 4.0 |
| Isopentane | 9.2 | 5.2 | 5.2 |
| Pentenes | 0.5 | 0.0 | 0.0 |
| | 100.0 | 100.0 | 89.9 |
| Feed Consumption, Wt. Percent on Feed Component: | | | |
| Ethylene | 49.4 | 31.3 | 31.6 |
| Methane | 2.3 | 2.0 | 5.8 |
| Radiation Yields, Mol./100 ev.: Alkylate | 410 | 840 | 460 |

EXAMPLE 3

Gamma methylation reactions were carried out utilizing a CO⁶⁰ radiation source. The facilities employed were of conventional type and have been fully described by J. F. Black et al., The International Journal of Applied Radiation and Isotopes, 1, 256 (1957). To illustrate the present invention, the experimental data for the methane-ethylene system are given in Table III. The conversions were carried out at an intensity of 0.12 mr./hr., at 55 atm. using 9/1 mole ratios of methane/ethylene. Material balances were better than 95 wt. percent and all radiation yields refer to experiments in which the blank (thermal) contribution was subtracted out if present. One hour batch exposure of the feed at 800° F. resulted in 71.4 wt. percent conversion of ethylene and a yield of alkylate (having 3 or more carbon atoms) of 110 wt. percent based on ethylene reacted. Radiation yields (G) in the range of 1000–20,000 have been recorded.

*Table III*

| Product | Selectivity, Wt. Percent on Feed Reacted | Molecules Made per 100 ev. (G) |
|---|---|---|
| Propane | 37.2 | 8,120 |
| Propylene | 14.9 | 3,400 |
| Butene | 13.3 | 2,290 |
| Isopentane | 5.1 | 680 |
| Pentene | 6.5 | 892 |
| Polymer | 15.4 | 1,640 |

Results of the methane/propylene reaction carried out in the manner of Example 3 are given in Table IV below.

*Table IV*

$CH_4/C_3$ = (10 mole percent) 750° F. 55 atms. Dose = 0.72 mr. (@ 0.12 mr./hr.).
Conv. wt. percent of feed reacted = 10.0
Olefin conv., wt. percent of feed = 31.0
Selectively to $C_4$+Alkylate = 104
Radiation yield to $C_4$+Alkylate molecules made/100 ev. = 890

Selectivity, wt. percent on feed reacted:
$C_3$ and lower M.W. _____ 29.8
$iC_4$ _____ 16.0
$iC_5$ _____ 11.3
$iC_6$ _____ 0.4
$iC_7$ _____ 2.7
$nC_4$–$nC_7$ _____ 1.6
Olefins _____ 21.0
$C_8$+ _____ 16.3

EXAMPLE 4

A methane/hexene-1 system having a methane-olefin mole ratio of 10:1 is reacted in accordance with the present invention by subjecting the hydrocarbon system, in the manner of Example 3, to a total dosage of electron irradiation in the range of $10^{-6}$ to $10^3$ kwh. per pound of feed. Electrons with energies above 0.5 mev. are obtained from a Van de Graaff electrostatic accelerator delivering a 1 to 500 microampere beam.

Other systems which can be converted by the processes described in the above examples are methane/pentene-1, methane/(ethylene, propylene) and methane/$C_{3-5}$ mono-olefin.

The above examples show that light hydrocarbons can be upgraded with high radiation yields by irradiating a mixture consisting essentially of methane and mono-olefins having from 2 to 7 carbon atoms with high energy ionizing radiation.

It is to be understood that the above-described arrangements and techniques are but illustrative of the application of the principles of this invention. Numerous other arrangements and procedures may be devised by those skilled in the art without departing from the spirit and scope of the invention.

What is claimed is:
1. A hydrocarbon conversion process which comprises subjecting to high energy ionizing radiation equivalent to at least 30 electron volts, a hydrocarbon system comprising methane and a mono-olefin, the methane/olefin mole ratio in said system being in the range of 9:1 to 200:1, irradiating said system at a temperature in the range of 650° to 900° F. at a pressure in the range of 10 to 55 atmospheres until a total dosage in the range of $10^{-6}$ to $10^3$ kwh. of radiation energy per pound has been absorbed and recovering a saturated hydrocarbon having a greater number of carbon atoms than said mono-olefin.

2. A hydrocarbon conversion process which comprises continuously subjecting to high energy ionizing radiation equivalent to at least 30 electron volts a hydrocarbon feed stock containing at last 75% by weight of a methane/olefin mixture, said olefin being selected from the group consisting of mono-olefins having in the range of 2 to 7 carbon atoms and mixtures thereof, the methane/olefin mole ratio in said system being in the range of 9:1 to 200:1, irradiating said system at a temperature in the range of 650° to 950° F. at a presure in the range of 10 to 55 atmospheres until a total dosage in the range of $10^{-6}$ to $10^3$ kwh. of radiation energy per pound has been absorbed and recovering a saturated hydrocarbon having a greater number of carbon atoms than said mono-olefin.

3. A hydrocarbon conversion process which comprises subjecting a hydrocarbon system consisting essentially of methane and a mono-olefin selected from the group consisting of mono-olefins having 2 to 12 carbon atoms and mixtures thereof at superatmospheric pressures and elevated temperatures to a total dosage of high energy ionizing radiation in the range of $10^{-6}$ to $10^3$ kwh. per pound, said radiation being equivalent to at least 30 electron volts, the methane/olefin mole ratio in said system being in the range of 9:1 to 200:1.

4. A process according to claim 3 wherein said ionizing radiation comprises neutrons.

5. A process according to claim 3 wherein said ionizing radiation comprises neutrons.

6. A process according to claim 3 wherein said ionizing radiation comprises electrons.

7. A process according to claim 3 wherein said hydrocarbon system comprises a refinery feed boiling at a temperature in the range of −258° to 200° F. and contains at least 95 wt. percent of said methane/mono-olefin mixture.

8. A hydrocarbon conversion process which comprises subjecting to high energy ionizing radiation equivalent to at least 30 electron volts a hydocarbon system consisting essentially of methane and ethylene; the methane/ethylene mole ratio in said system being in the range of 9:1 to 200:1, irradiating said system at a temperature in the range of 650° to 900° F. at a pressure in the range of 10 to 55 atmospheres until a total dosage in the range of $10^{-6}$ to $10^3$ kwh. of radiation energy per pound has been absorbed and recovering a saturated hydrocarbon having at least 3 carbon atoms per molecule.

References Cited in the file of this patent
UNITED STATES PATENTS

| | | |
|---|---|---|
| 2,636,853 | Franklin | Apr. 28, 1953 |
| 2,657,985 | Schutze et al. | Nov. 3, 1953 |
| 2,743,223 | McClinton et al. | Apr. 24, 1956 |
| 2,762,768 | Cier | Sept. 11, 1956 |
| 2,872,396 | Wilson et al. | Feb. 3, 1959 |